DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 818

T900,008

PROCESS FOR TREATING SHEET MATERIALS WITH ANIONIC AQUEOUS POLYURETHANE DISPERSIONS

Gerhard Ballé, Cologne, Wolfgang Keberle and Karlheinz Kowalewski, Leverkusen, and Bruno Zorn, Cologne, Germany, assignors to Farbenfabriken Bayer Aktiengesellschaft, Leverkusen, Germany

Filed Aug. 11, 1971, Ser. No. 170,961

Claims priority, application Germany, Aug. 21, 1970, P 20 41 550.3

Int. Cl. C08d *9/10;* C08g *37/32*

U.S. Cl. 260—29.4 VA

No Drawing. 15 Pages Specification

Heat cured coatings are provided for leather and microporous polyurethane or polyvinyl material. The coatings are prepared from aqueous mixtures of tri- to hexamethylol melamine with (1) dispersions of anionic polyurethanes, with (2) mixtures of dispersions of anionic polyurethanes with vinyl latexes, or with (3) dispersions of graft copolymers of ethylenic monomers with the anionic polyurethanes. The anionic polyurethanes are preferably emulsifier-free aqueous dispersions of polyurethanes having 0.1 to 3% by weight of sulfonate and/or carboxylate groups introduced by combining an alkali salt of taurine, methyltaurine, 6-aminocaproic acid, glycine, sulfanilic acid, diaminobenzoic acid, ornithine or lysine, or addition products of sultones with diamines, with isocyanate group-containing prepolymers prior to or simultaneously with dispersion in water. The graft copolymers are prepared by introducing monomers into the anionic polyurethane dispersion under free-radical polymerization conditions. Monomers include the free acids, esters and amides of such unsaturated acids as acrylates and maleates, their methylol amides, and the nitrile monomers, vinyl esters, ethers, ketones, and amides, hydrocarbons as styrenes, mono and diolefins, etc. Anionic or nonionic emulsifiers other than the anionic polyurethane may optionally be used. Acid catalyst and modifiers such as pigments, dyes and stabilizers, etc. may be included.